(12) United States Patent
Bynum

(10) Patent No.: US 7,093,964 B2
(45) Date of Patent: Aug. 22, 2006

(54) COMPACT, LOW-LEVEL VEHICLE INTERIOR LAMP ASSEMBLY

(75) Inventor: Stephen A. Bynum, Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 80 days.

(21) Appl. No.: 10/978,642

(22) Filed: Nov. 1, 2004

(65) Prior Publication Data
US 2006/0092659 A1 May 4, 2006

(51) Int. Cl.
*B60Q 1/00* (2006.01)
(52) U.S. Cl. .................. 362/488; 362/547; 362/800
(58) Field of Classification Search ............... 362/488, 362/490, 545, 549, 640, 646, 647
See application file for complete search history.

(56) References Cited

U.S. PATENT DOCUMENTS

| | | | |
|---|---|---|---|
| 4,466,050 A | 8/1984 | Lockard | |
| 4,471,414 A | 9/1984 | Savage, Jr. | |
| 4,812,814 A | 3/1989 | Elliot | |
| 4,949,228 A | 8/1990 | Lin | |
| 5,388,035 A | 2/1995 | Bodem, Jr. | |
| 5,516,143 A | 5/1996 | Lang | |
| 6,000,822 A | 12/1999 | Polizzi | |
| 6,149,288 A | 11/2000 | Huang | |
| 6,158,869 A | 12/2000 | Barnes | |
| 6,160,475 A | 12/2000 | Hornung | |
| 6,257,736 B1 * | 7/2001 | Fehrenbach | 362/640 |
| 6,464,381 B1 | 10/2002 | Anderson, Jr. | |
| 6,536,928 B1 | 3/2003 | Hein | |
| 6,594,417 B1 | 7/2003 | Hulse | |
| 6,595,656 B1 | 7/2003 | Yoda | |
| 2001/0030871 A1 | 10/2001 | Anderson | |
| 2002/0145871 A1 | 10/2002 | Yoda | |
| 2003/0002273 A1 | 1/2003 | Anderson | |
| 2003/0043590 A1 | 3/2003 | Walser | |
| 2003/0048641 A1 | 3/2003 | Alexanderson | |
| 2003/0133307 A1 | 7/2003 | Sugihara | |
| 2004/0213013 A1 * | 10/2004 | Desjardins | 362/545 |
| 2005/0128761 A1 * | 6/2005 | Wu | 362/498 |

* cited by examiner

*Primary Examiner*—Ali Alavi
(74) *Attorney, Agent, or Firm*—Dickinson Wright PLLC

(57) ABSTRACT

A compact lamp assembly provides illumination for a vehicle interior, and generally includes a housing, a circuit board, and an LED that emits light through an opening in the housing. The front wall of the housing includes first and second installation features for installing the lamp assembly in a slot in a vehicle interior panel. The first installation feature has a flange connected to the housing by a neck portion that encircles the opening in the housing and that is designed to slide into the slot so that the housing is held in place on the panel by the flange. The second installation feature includes a pair of apertured extensions of the front wall that receive fasteners to hold the lamp assembly in place against the rear side of the panel.

21 Claims, 4 Drawing Sheets

COMPACT, LOW-LEVEL VEHICLE INTERIOR LAMP ASSEMBLY

TECHNICAL FIELD

This invention relates generally to lamp assemblies and, more particularly, to compact lamp assemblies that utilize light emitting diodes (LEDs) to provide vehicle interior illumination.

BACKGROUND OF THE INVENTION

Lamp assemblies have traditionally been used in vehicle interiors to provide many types of illumination, including mood lighting which can create a certain ambiance by illuminating a selected area or object in a manner that does not impair the driver's vision at night. Mood lighting is commonly employed in a vehicle interior by mounting a lamp assembly in a somewhat hidden or out-of-the-way location, like under an armrest or a seat. From that inconspicuous location, the lamp assembly is able to illuminate a nearby area or object with a relative low level of illumination without the source of the light being apparent. It is oftentimes advantageous for such lamp assemblies to be of a relatively small and compact nature, thus increasing the possible locations where the lamp assembly can be mounted.

Traditionally, incandescent bulbs were used as a light source for such lamp assemblies, although LEDs are becoming more popular alternatives to incandescent bulbs, and can offer certain advantages. For example, in some applications LEDs last longer, are more energy efficient, and are smaller in size, making it easier to utilize the LEDs in different locations and without thermal management constraints. In a typical application, the LED will be used in conjunction with a circuit that supplies power to the LED and that may include various circuit components, such as a current limiting resistor. For this reason, the LED and/or other components may be mounted on a circuit board which must then be accommodated in the packaging of the components as a single integrated assembly.

SUMMARY OF THE INVENTION

In accordance with one aspect of this invention, there is provided a lamp assembly that generally includes a housing, a circuit board, and a light emitting diode (LED). The housing generally includes a front wall with an opening and an installation feature, so that the assembly can be installed from a rear side of a vehicle interior component. The circuit board can form a rear wall of the housing, or can be press-fit or otherwise mounted inside the housing with a rear wall enclosing the circuit board in the housing. The installation feature can be a first installation feature which comprises a flange that extends around the opening and that is connected to the front wall via a neck portion so that this neck portion can be slid into a slot formed in a vehicle panel or other interior component with the material of the panel being captured between the flange and front wall. Alternatively, the installation feature can be second installation feature with comprises one or more lateral extensions of the front wall that contain an aperture for mounting of the lamp assembly to the rear side of the vehicle panel using a projection or other fastener that extends into the aperture.

In accordance with another aspect of the invention, there is provided a lamp assembly that generally includes a housing with a front wall, at least one side wall, and an LED, wherein the housing front wall has two separate installation features which can be the first and second installation features noted above.

There is further provided a method of installing a lamp assembly that includes the use of first and second installation features.

BRIEF DESCRIPTION OF THE DRAWINGS

These and other objects, features and advantages of this invention will be apparent from the following detailed description of the preferred embodiments and best mode, the appended claims and the accompanying drawings, wherein like designations denote like elements, and wherein:

DETAILED DESCRIPTION OF THE PREFERRED EMBODIMENTS

Figure 1:
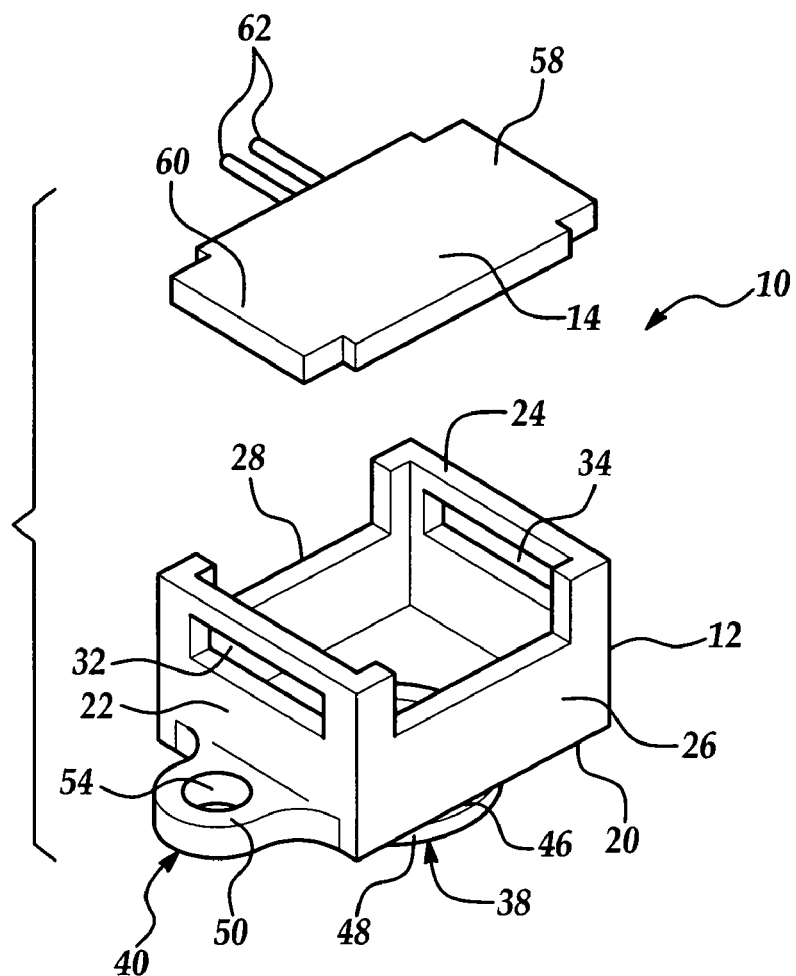
FIG. 1 is a perspective view of a first embodiment of the lamp assembly of this invention, showing a circuit board being inserted from the rear of the assembly.
Figure 2:
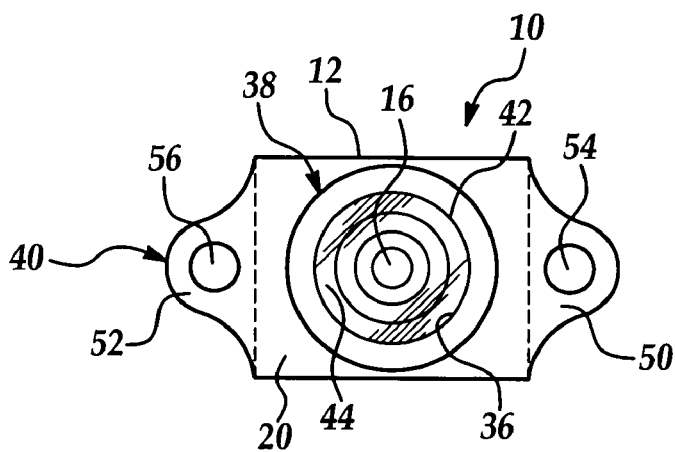
FIG. 2 is a top plan view of the lamp assembly of FIG. 1.

Referring to the figures, there are shown several embodiments of the lamp assembly of this invention being used in a vehicle interior. Typically, "vehicle interior" constitutes an automotive interior; however, "vehicle interior" could just as easily include the interiors of vehicles such as recreational vehicles, airplanes, trains, boats, or the like. Thus, the word "vehicle" is used herein in its broadest sense to encompass all types of vehicles that require some type of illumination, including but not limited to automobiles. Furthermore, the lamp assembly of this invention could be used to provide lighting other than interior lighting, for instance it could be used to illuminate exterior spaces.

Referring to FIGS. 1–4, there is shown a first embodiment of lamp assembly 10 that generally comprises a housing 12, a circuit board 14 and a light emitting diode (LED) 16. Housing 12 is preferably made from a rigid conventional plastic material, such as a light impermeable polypropylene material, or acrylonitrile butadiene styrene resin (ABS), or other appropriate materials known to those skilled in the art. Housing 12 preferably includes side walls 22, 24, 26 and 28 extending from a front wall 20. The side walls generally extend perpendicularly away from front wall 20, and together form an integral structure for receiving and protecting circuit board 14 and LED 16. In this embodiment, side walls 22 and 24 extend further away from front wall 20 than do side walls 26 and 28, and they have respective cutouts or slots 32 and 34. The rectangular slots 32 and 34 extend completely through the side walls and are sized to receive tabs extending from circuit board 14, as will be further explained.

Front wall 20 is generally planar and includes an opening 36, a first installation feature 38, and a second installation feature 40. Preferably, opening 36 is circular and is located in the center of front wall 20. A transparent lens 44 is secured in the opening 36 and this lens comprises a translucent portion 42 of the front wall. Where no lens or window 44 is used, the opening itself comprises the translucent portion 42 of the front wall. In either case, light emitted by LED 16 passes through translucent portion 42. Where a simple transparent window 44 is used or where there is no covering used for the opening 36 at all, light emitted from LED 16 simply passes through the opening naturally and unimpeded; however, where an optical refractory lens 44 is used, the light can be focused, dispersed, or otherwise affected, depending upon the characteristics of the lens that is used.

Also shown in FIGS. 1–4 is first installation feature 38 and second installation feature 40. The term "installation feature" broadly encompasses a large class of components or features that can be used to attach or install the lamp assembly to a vehicle component, substrate, panel or other appropriate mounting surface. For instance, welding members, adhesive members, male and female connection members, snap-fit connection members, staking, as well as any other installation feature known to those of skill in the art, are included within the large class.

Figure 3:
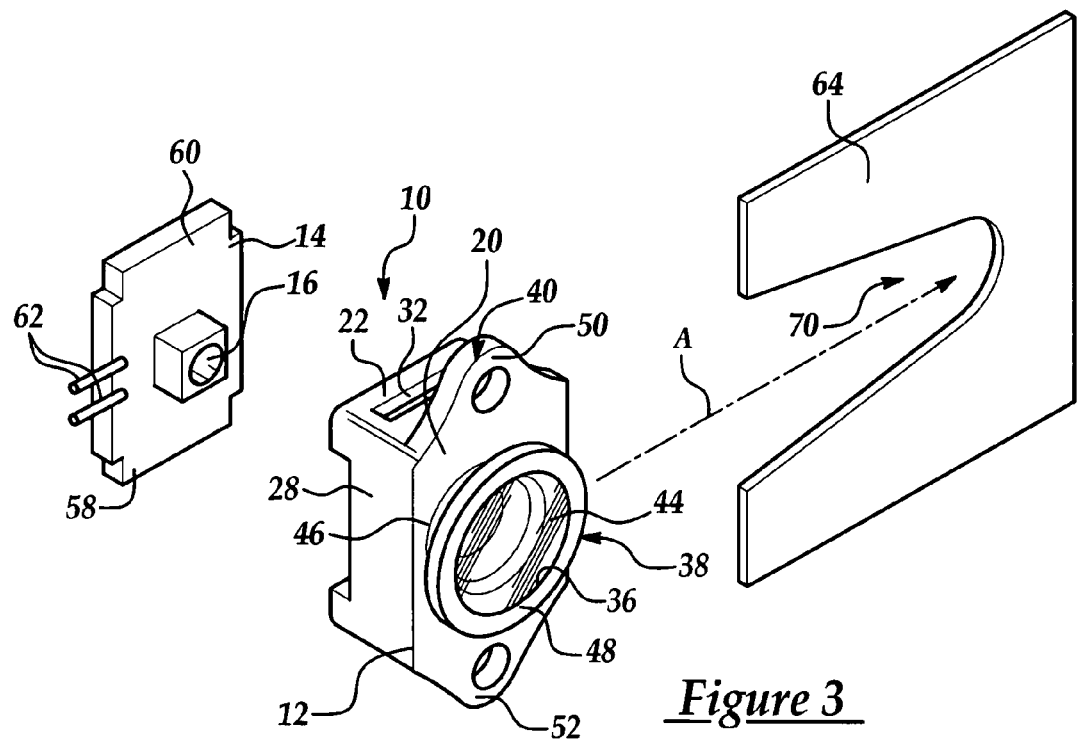
FIG. 3 is another perspective view of the lamp assembly of FIG. 1, showing the assembly being installed in a vehicle panel or other component via a first installation feature.
Figure 4:
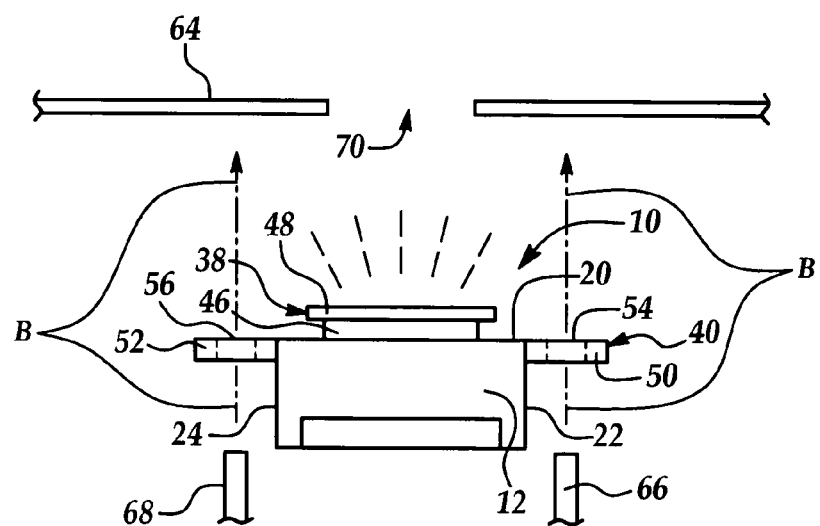
FIG. 4 is a side elevation view of the lamp assembly of FIG. 1, showing the assembly being installed in a vehicle panel or other component via a second installation feature.

With specific reference to FIGS. 3 and 4, first installation feature 38 is shown being slid into a converging slot 70 of a vehicle interior panel or other component 64 such that it firmly maintains the lamp assembly in place. First installation feature 38 extends away from front wall 20, and includes a neck portion 46 and a peripheral flange 48. Neck portion 46 is preferably a short cylindrical component that extends perpendicularly away from front wall 20 in an axial direction. The axial length of the rim portion is approximately the same thickness as that of the vehicle panel 64 to which the lamp assembly is being attached, thus allowing the panel material at slot 70 to be captured between a rear surface of flange 48 and a front surface of front wall 20. Neck 46 is concentric with and extends around the periphery of opening 36. Likewise, flange 48 is concentric with and extends around the periphery of opening 36 and neck 46. Flange 48 extends laterally away from neck portion 46 and the width of flange 48, that is the difference between the inner and outer radii, can vary according to the functional and aesthetic considerations for the particular application in which the lamp assembly is used.

Second installation feature 40 can either be used in lieu of or in addition to first installation feature 38. According to the embodiment shown in FIG. 4, the second installation feature includes a pair of lateral extensions 50 and 52 of front wall 20, each located on opposing sides of the housing 12. Extensions 50 and 52 are mounting features that are formed as a unitary portion of front wall 20 during molding of the housing. These extensions 50 and 52 include holes 54 and 56, respectively, that extend completely through the extensions, and are adapted to receive a fastener, such as heat stakes 66, 68, screws, etc. The holes shown here are circular in shape, however, alternative shapes such as ovals, squares, polygonal, etc. could be used as well. Where the first and second installation features are used together to secure the lamp assembly in place, the fasteners 66, 68 need only retain the lamp assembly in the slot 70 of the vehicle panel against lateral movement and so can comprise, for example, small projections on the rear side of the vehicle panel that snap into the holes 54, 56.

Circuit board 14 can be designed according to one of numerous embodiments known to those of skill in the art, including embodiments incorporating various types of circuit logic and components. Referring to FIG. 3, the circuit board includes a printed circuit to which LED 16 is electrically connected in a manner such that the LED is mounted to the circuit board and receives its electrical power from via the printed circuit. Circuit board 14 also preferably includes tabs 58 and 60 and a pair of terminals or lead wires 62. Tabs 58 and 60 are sized to snap into respective slots 34 and 32, thereby firmly retaining the circuit board in place, which also doubles as a rear wall of the housing to thereby protect LED 16 and any other components inside the housing. Lead wires 62 receive power from an outside power source such as a vehicle battery. When assembled, circuit board 14 is located generally within housing 12. Alternatively, instead of slots 32, 34 extending all of the way through the side walls, they could simply be indentations that receive the tabs and extend only partially through the side walls. In this manner, tabs 58 and 60 would slide into indentations formed on the inner side of the housing side walls. Other designs for snap-fitting or otherwise connecting the circuit board to the housing can also be employed.

LED 16 acts as the light source for lamp assembly 10, and can be one of numerous models known to those skilled in the art. The particular characteristics of the LED, such as its intensity, color, power consumption, etc., are chosen for the particular lighting application in which the lamp assembly is being used. LED 16 is electrically coupled to circuit board 14 and, when assembled, is located within housing 12. By locating the circuit board and LED within the confines of housing 12, those two components are better protected from the surrounding environment. The LED lies along the center axis of opening 36. In this position it is arranged to emit light through translucent section 42 which, as previously mentioned, can either include an optical component such as a defracting lens or transparent window, or simply be an opening. Of course, LED 16 could alternatively be aligned at some angle such that light is emitted in a particular direction. The illumination intensity of light emitted from the LED can be set as needed or desired for a particular application. This can be done by any of a number of techniques known to those skilled in the art. For example, low level illumination can be provided by limiting the current through the LED using either the circuitry on circuit board 14 or via external components.

Figure 5:
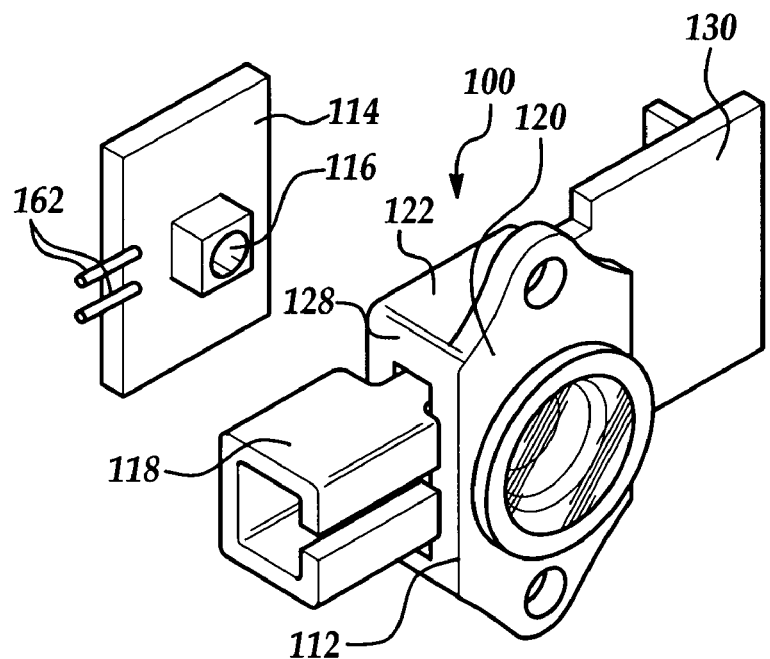
FIG. 5 is a perspective view of a second embodiment of the lamp assembly of this invention.

Turning now to FIG. 5, a second embodiment of this invention is shown having a lamp assembly 100 that generally includes a housing 112, a circuit board 114, and an LED 116. According to this embodiment, housing 112 is somewhat different and generally includes a front wall 120, four side walls 122–128 (only two of which can be seen from this perspective) and a rear wall 130. All of the side walls extend away from front wall 120 approximately the same length, and in particular, side wall 122 and its opposing side wall do not have slots for tabs of the circuit board. Instead, the circuit board is simply press-fit into the housing. Other features could be used to mount the circuit board inside the housing. For instance, the inner surfaces of the side walls could have channels or indentations such that the circuit board can be slid into place, as opposed to being snapped into place. Rear wall 130 is preferably attached by a unitary hinge (living hinge) to an edge of a side wall such that it can be swung from an open position (as shown) to a closed snap-fit position (not shown). When rear wall 130 is open, circuit board 114 can be inserted in the housing. Once inserted, rear wall 130 is closed to protect the housing interior components from any contaminants.

One of the side walls of lamp assembly 100 preferably has an electrical connector 118 extending therefrom. The electrical connector can either be integrally formed to the housing side wall, or it can be a separate component that is attached to the housing side wall. In either case, the electrical connector provides lamp assembly 100 with a quick electrical connect to the vehicle electrical system; a feature that provides certain manufacturing and replacement advantages. The connector, which when electrically coupled to terminals or lead wires 162, forms a detachable electrical connection for the lamp assembly, and can be of a conventional design known to those skilled in the art.

For the sake of brevity, descriptions of parts in the second embodiment that are equivalent to those described in the first embodiment have been omitted. For example, the description of the front wall, the first and second installation features, and the LED provided in connection with the embodiment of FIGS. 1–4 is applicable here as well.

Figure 6:
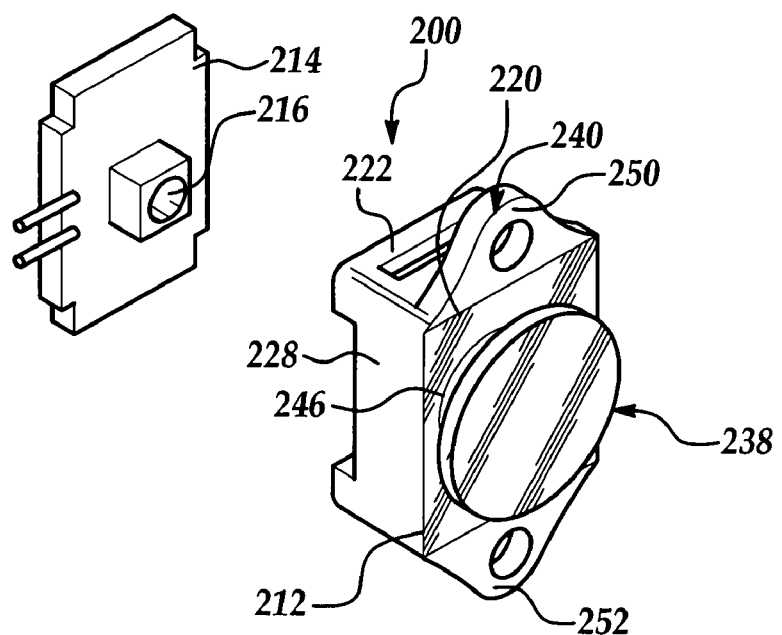
FIG. 6 is a perspective view of a third embodiment of the lamp assembly of this invention.

Turning now to FIG. 6, a third embodiment of this invention is shown having a lamp assembly 200 that generally includes a housing 212, a circuit board 214, and an LED 216. Housing 212 generally includes a front wall 220, and four side walls 222–228 (only two of which can be seen from this perspective). In this embodiment, front wall 220 is somewhat different. Front wall 220 has a first installation feature 238 with a rim portion 246 and a second installation feature 240 with extensions 250 and 252, but does not have an opening. Instead, a planar surface encloses the front wall. The planar surface is integrally formed with first installation feature 238. Here, the front wall including the first installation feature 228 is mostly made from a transparent plastic material. The planar surface, first installation feature 238, and a portion of front wall 220 not including extensions 250 and 252, are all made from the same transparent plastic material. Optionally, the entire front wall 220 or entire housing 212 can be made from the same transparent material so that the housing can be molded as a single, unitary component. The transparent material allows light to pass from LED 216 through the housing generally unaffected. Such material will be known to those skilled in the art.

Again for brevity, parts in the third embodiment that are shown in FIG. 6 but not described, or only briefly described, can be the same both in structure and function to those same parts described in the first embodiment.

Figure 7:
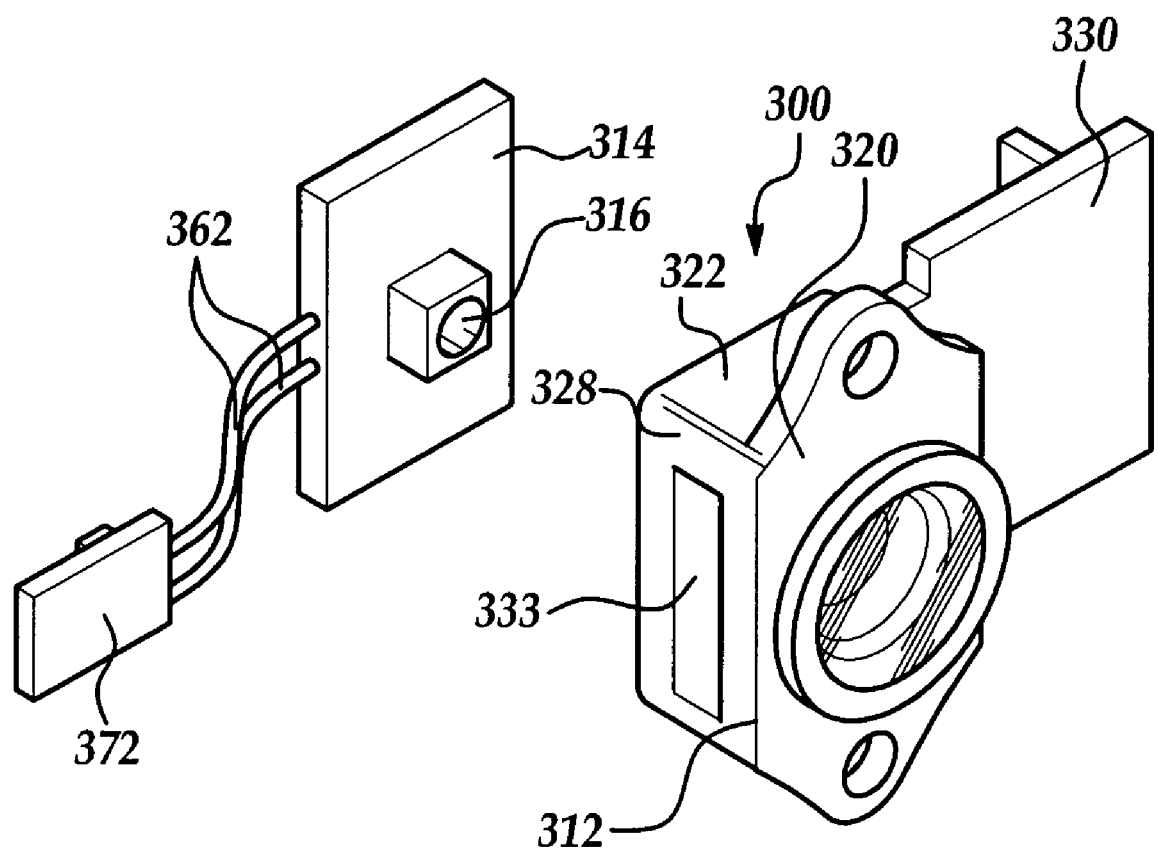
FIG. 7 is a perspective view of a fourth embodiment of the lamp assembly of this invention.

Turning now to FIG. 7, a fourth embodiment of this invention is shown having a lamp assembly 300 that generally includes a housing 312, a circuit board 314, and an LED 316. According to this embodiment, housing 312 and circuit board 314 are somewhat different than in the first embodiment. The housing generally includes a front wall 320, four side walls 322, 328 (again, only two can be seen from this perspective) and a rear wall 330. All of the side walls extend away from front wall 320 approximately the same length. Side wall 328 includes an aperture 333 to provide a passage for an electrical connection. Aperture 333 has a generally rectangular shape, is centered on side wall 328, and extends completely through side wall 328. But various modifications could be made to the slot, such as shape and location, so long as it provides a passage for an electrical connection. Similar to the second embodiment, circuit board 314 is positioned inside the housing by being press-fit into the housing or otherwise. Also similar to the second embodiment, rear wall 330 is preferably attached by a unitary hinge (living hinge) to an edge of a side wall such that it can be similarly swung open and closed when inserting circuit board 314.

Circuit board 314 includes a pair of connected terminals or lead wires 362 that are connected to printed circuit pads on the circuit board 314 at one end, and are connected to an electrical connector 372 at the other end. The lead wires and electrical connector form a detachable electrical connection for the lamp assembly that will be known to those skilled in the art as a conventional pigtail design. These lead wires are routed out through the aperture 333 when the circuit board 314 is installed in the housing 312.

Again for brevity, parts in the fourth embodiment that are shown in FIG. 7 but not described, or only briefly described, can be the same both in structure and function to those same parts described in the first embodiment.

During installation, the lamp assembly of this invention is preferably installed from the rear surface of vehicle panel 64. Depending upon the particular application for which the lamp assembly is being used, either the first installation feature, the second installation feature, or both, can be utilized to secure and maintain the lamp assembly in place. Using first installation feature 38, as best shown in FIG. 3, lamp assembly 10 is slid into slot 70 along direction A, such that neck portion 46 contacts a peripheral surface of the slot, thus preventing the lamp assembly from being slid further. Once the lamp assembly is in place, the material of panel 64, particularly a peripheral portion of the panel that surrounds slot 70, is captured between the outer surface of front wall 20 and the inner surface of flange 48.

Using second installation feature 40, as best shown in FIG. 4, lamp assembly 10 is also preferably retained against rear side of vehicle panel 64. Use of this installation feature involves lamp assembly 10 being lined up in slot 70 such that projections 66 and 68 may be respectively inserted into holes 54, 56 at two locations adjacent the slot 70, as shown by arrows B. According to the embodiment shown here, projections 66 and 68 are heat stakes that, once inserted through the holes, are at least partially melted, thereby attaching the lamp assembly to the vehicle panel. Projections 66 and 68 are shown as heat stakes, but as noted earlier, could be of a different nature. For instance, the projections could be preformed as a part of the rear side of panel 64 or could be pre-attached to the rear side of panel 64 such that the holes must be lined up with the stationary projections when the first installation feature is slid into the slot 70. Also, the holes and projections could be omitted altogether, such that extensions 50 and 52 are simply adhered or welded to the rear side of panel 64.

It will thus be apparent that there has been provided in accordance with this invention a compact vehicle interior lamp assembly which achieves the aims and advantages specified herein. It will of course be understood that the foregoing description is of preferred exemplary embodiments of the invention and that the invention is not limited to the specific embodiments shown. Various changes and modifications will become apparent to those skilled in the art and all such variations and modifications are intended to come within the scope of the appended claims.

As used in this specification and appended claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

I claim:

1. A lamp assembly for use with a vehicle component, comprising:

a housing having a generally planar front wall and at least one side wall extending therefrom, said front wall including an opening;

a circuit board located generally within said housing; and a light emitting diode (LED) connected to said circuit board and arranged to emit light through said opening;

wherein said front wall includes an installation feature to thereby permit said lamp assembly to be installed from a rear side of the vehicle component via said installation feature, said installation feature comprising:
  i) a neck portion that projects outwardly away from said front wall and extends around at least a portion of the periphery of said opening, and
  ii) a flange that extends around at least a portion of the periphery of said opening, such that once installed said neck portion extends through a slot in the vehicle component with material of the vehicle component being captured between said flange and said front wall.

2. The lamp assembly of claim 1, wherein said installation feature comprises
  i) at least one extension of said front wall that extends laterally away from said housing, and
  ii) a hole located in said extension and adapted to receive a fastener, such that once installed said fastener retains said front wall in contact with a rear surface of the vehicle component.

3. The lamp assembly of claim 1, wherein said circuit board includes a plurality of terminals.

4. The lamp assembly of claim 1, wherein said circuit board comprises a rear wall of said housing and includes at least one tab, and wherein said side wall includes a slot, wherein said tab fits into said slot.

5. The lamp assembly of claim 1, wherein said housing includes at least two side walls and a rear wall, and wherein said circuit board is positioned between said side walls, and said rear wall is attached to one of said side walls via living hinge.

6. The lamp assembly of claim 1, wherein said housing includes at least two side walls and a rear wall, said rear wall is attached to one of said side walls, and also wherein one of said side walls includes an aperture for an electrical connection to extend therethrough.

7. The lamp assembly of claim 1, further comprising a transparent lens located in said opening.

8. The lamp assembly of claim 1, further comprising an electrical connector extending from said side wall to provide said lamp assembly with a detachable electrical connection.

9. A lamp assembly for use in a vehicle interior, comprising:
  a housing having a front wall and at least one side wall extending therefrom, said front wall including first and second installation features, wherein said first installation feature comprises a flange connected to said front wall by a neck portion that generally extends perpendicularly away from said front wall and is sized to allow said neck portion to extend through a slot in the vehicle interior component, and said second installation feature comprises an extension of said front wall that generally extends laterally away from said housing and is designed to connect to a rear surface of the vehicle interior component at a location adjacent said slot; and
  an LED located within said housing and arranged such that it provides illumination out through said housing.

10. The lamp assembly of claim 9, wherein said housing has an opening in said front wall, and said neck portion and said flange extend around said opening.

11. The lamp assembly of claim 9, wherein said extension of said front wall includes a hole adapted to receive a projection located on the vehicle interior component.

12. The lamp assembly of claim 11, wherein said projection is a heat stake.

13. The lamp assembly of claim 9, further comprising a circuit board generally located within said housing and connected to said LED.

14. The lamp assembly of claim 13, wherein said circuit board forms a rear wall of said housing.

15. The lamp assembly of claim 13, wherein said housing includes at least two side walls and a rear wall, and wherein said circuit board is positioned between said side walls, and said rear wall is attached to one of said side walls via a living hinge.

16. The lamp assembly of claim 13, wherein said housing includes at least two side walls and a rear wall, said rear wall is attached to one of said side walls, and also wherein one of said side walls includes an aperture for an electrical connection to extend therethrough.

17. The lamp assembly of claim 9, further comprising a transparent lens located in said opening.

18. The lamp assembly of claim 9, further comprising an electrical connector extending from said side wall to provide said lamp assembly with a detachable electrical connection.

19. The lamp assembly of claim 9, wherein said front wall and said first installation feature are formed from a transparent plastic material.

20. A lamp assembly for use with a vehicle interior component, comprising:
  a housing having a front wall and at least first and second side walls;
  said front wall is generally planar and includes an opening, a peripheral neck portion, a flange, and at least one mounting feature;
  a transparent window in said opening to allow light to pass through said opening,
  said neck portion at least partially surrounds said opening, and extends perpendicularly away from said front wall,
  said flange extends laterally from said neck portion and at least partially surrounds said opening,
  said mounting feature comprises an extension of said front wall that extends laterally away from said housing and includes a hole for receiving a complementary projection; and
  said first and second side walls extend from said front wall;
  a circuit board mounted in said housing between said side walls; and
  an LED electrically coupled to said circuit board and arranged to provide illumination through such translucent window.

21. A method for attaching a lamp assembly to a vehicle interior component comprising the steps of:
  (a) providing said lamp assembly with a housing having a generally planar front wall with first and second installation features;
  i) said first installation feature comprises a flange connected to said front wall via a neck portion that generally extends perpendicularly away from said front wall;
  ii) said second installation feature comprises an extension of said front wall that extends laterally away from said housing, said extension having a hole located therein;
  (b) placing said lamp assembly in a slot in the vehicle interior component such that material of the vehicle interior component at said slot is captured between said front wall and said flange; and
  (c) inserting a projection into said hole in said extension such that said lamp assembly is attached to the rear side of the vehicle interior component.

* * * * *

UNITED STATES PATENT AND TRADEMARK OFFICE
CERTIFICATE OF CORRECTION

PATENT NO. : 7,093,964 B2 Page 1 of 1
APPLICATION NO. : 10/978642
DATED : August 22, 2006
INVENTOR(S) : Stephen A. Bynum It is certified that error appears in the above-identified patent and that said Letters Patent is hereby corrected as shown below:

Column 1, Line 61     Please replace "with comprises" with -- which comprises --

Column 5, Line 47     Please replace "322,328" with -- 322 - 328 --

Signed and Sealed this

Fourteenth Day of November, 2006

JON W. DUDAS
*Director of the United States Patent and Trademark Office*